United States Patent [19]

Imoto

[11] Patent Number: 4,670,881
[45] Date of Patent: Jun. 2, 1987

[54] METHOD OF CORRECTING DATA CARRIED ON VIDEO FORMAT SIGNAL

[75] Inventor: Sumio Imoto, Tokorozawa, Japan

[73] Assignee: Pioneer Electronic Corporation, Tokyo, Japan

[21] Appl. No.: 716,393

[22] Filed: Mar. 27, 1985

[30] Foreign Application Priority Data

Mar. 30, 1984 [JP] Japan .................................. 59-62620

[51] Int. Cl.$^4$ ............................................. G06F 11/10
[52] U.S. Cl. ...................................... 371/38; 371/39; 371/50; 360/38.1
[58] Field of Search ....................... 371/38, 50, 37, 39, 371/40; 360/38.1

[56] References Cited

U.S. PATENT DOCUMENTS

| 4,204,634 | 5/1980 | Barsuhn | 371/38 |
| 4,371,963 | 2/1983 | Edwards | 371/50 |
| 4,433,416 | 2/1984 | Kojima | 371/38 X |
| 4,495,623 | 1/1985 | George | 371/40 X |
| 4,564,945 | 1/1986 | Glover | 371/40 X |
| 4,586,183 | 4/1986 | Wilkinson | 371/39 |

Primary Examiner—Jerry Smith
Assistant Examiner—Robert W. Beausoliel, Jr.
Attorney, Agent, or Firm—Schwartz, Jeffery, Schwaab, Mack, Blumenthal & Evans

[57] ABSTRACT

A method of correcting errors in the information and control data of a video format signal containing redundant parity check bits, wherein the information data bits and associated parity check bits are assigned to the addresses located in an information data block and the control data bits and the associated parity check bits are assigned to the addresses located in a control data block, the two data blocks being carried on the video format signal. Prior to reproduction of the video format signal, the data blocks are extracted from the signal and are loaded into a memory whereupon the information data bits and then the control data bits are corrected by the respectively associated parity check bits. The control data block is divided into first and second subblocks, and the data bits are corrected by storing the first control data subblock and thereafter the information data block at selected addresses of the memory, executing the correction of the information data bits with use of the associated parity check bits, then loading the second control data subblock into the memory and storing it at selected ones of the addresses occupied by the parity check bits for the information data bits, and thereafter executing the correction of control data bits with use of the parity check bits contained in the two control data subblocks.

8 Claims, 8 Drawing Figures

METHOD OF CORRECTING DATA CARRIED ON VIDEO FORMAT SIGNAL

FIELD OF THE INVENTION

The present invention relates to improvements in the reproduction of video format signals and, particularly, to a method for correcting errors possibly contained in the digitized data carried on a video format signal.

BACKGROUND OF THE INVENTION

A video format signal is formulated to contain not only digitized video information and vertical and horizontal synchronization signal components but also additional signal components such as, for example, time-axis compressed sound information signal components and the control data signal components necessary for the reproduction of the video and sound information. Such a video format signal is recorded on an appropriate record medium such as a video disc and is reproduced in accordance with the control data in a "still-picture-with-sound" (SWS) system or a computerized video game machine.

The control data contained in a video format signal is predominant over various phases of the operation of the system to reproduce video and sound information in such a recording and reproducing system and is for this reason required to be completely cleared of errors before the information is reproduced. A video format signal recording and reproducing system is known which uses redundant parity check bits to correct errors in the digital control data in the video format signal received or read from a record medium. The parity check bits are formulated in association with the digital control data and are preliminarily inserted into the video format signal supplied or recorded in the medium. For correcting errors of the digital control data with the use of such parity check bits, the digital data extracted from the video format signal received or read from a record medium are once stored in the form of an n-dimensional sequence (where n is an integer) which is implemented by for example, a three-dimensional data block. Errors contained in the digital data are thus detected and corrected with the aid of the redundant parity check bits which form part of such a data block.

In a recording and reproduction system having these features, it is desirable that the digital data such as typically the control data be inserted compactly into each of the fields (or frames) of the video format signal to make an effective use of the limited time-axis vacancies of the video format signal. It is also desirable that the timings at which the digital data are to be extracted from the video format signal and the timings at which errors of the digital data are to be corrected be streamlined to enable the system to operate efficiently in its entirety and to improve the performance efficiency of a memory used in the system. The present invention contemplates provision of a method and a system which will satisfy these demands.

SUMMARY OF THE INVENTION

In accordance with the present invention, there is provided a method of correcting errors in the information data and control data bits of a video format signal containing redundant parity check bits associated with the information and control data bits, wherein the information data bits and the parity check bits associated therewith are respectively assigned to the addresses located in an information data block in the form of an n-dimensional sequence (where n is an integer) and the control data bits and the parity check bits associated therewith are respectively assigned to the addresses located in a control data block also in the form of an n-dimensional sequence and wherein the information data block and the control data block are carried on the video format signal and are, prior to reproduction of the video format signal, extracted from the video format signal and loaded into into a single memory means whereby errors in the information data bits are corrected with use of the parity check bits associated with the information data bits and thereafter errors in the control data bits are corrected with use of the parity check bits associated with the control data bits, the method being characterized in that the control data block is divided, in effect, into two halves consisting of first and second halves which are located immediately anterior and posterior to the information data block in the video format signal, and in that errors in the information data bits and and the control data bits are corrected by loading the first half of the control data block and thereafter the information data block into the memory means for storing the first half and the information data block at selected addresses of the memory means, executing the correction of the errors in the information data bits with use of the parity check bits associated with the information data bits, subsequently loading the second half of the control data block into the memory means and storing the second half at selected ones of the addresses occupied by the parity check bits associated with the information data bits, and thereafter executing the correction of the errors in the control data bits with use of the parity check bits contained in the first and second halves of the control data block. The number of the parity check bits associated with the information data bits and the total number of the control data bits and the parity check bits contained in the second half of the control data block are preferably equal to each other. Furthermore, the first and second halves of the control data block are preferably identical in size with each other, in which instance the first half of the control data block is stored at those addresses of the memory means which are located adjacent the addresses at which the information data block is to be stored, whereupon the first half of the control data block is relocated in the memory means so that the parity check bits associated with the information data bits are stored at addresses located adjacent the addresses at which the first half of the control data block have been located.

BRIEF DESCRIPTION OF THE DRAWINGS

The features and advantages of an error correcting method according to the present invention will be more clearly appreciated from the following description taken in conjunction with the accompanying drawings in which:

FIG. 1A is a schematic perspective view showing the two subblocks formed by the control data block illustrated in FIG. 1;

DETAILED DESCRIPTION OF THE INVENTION

Figure 1:
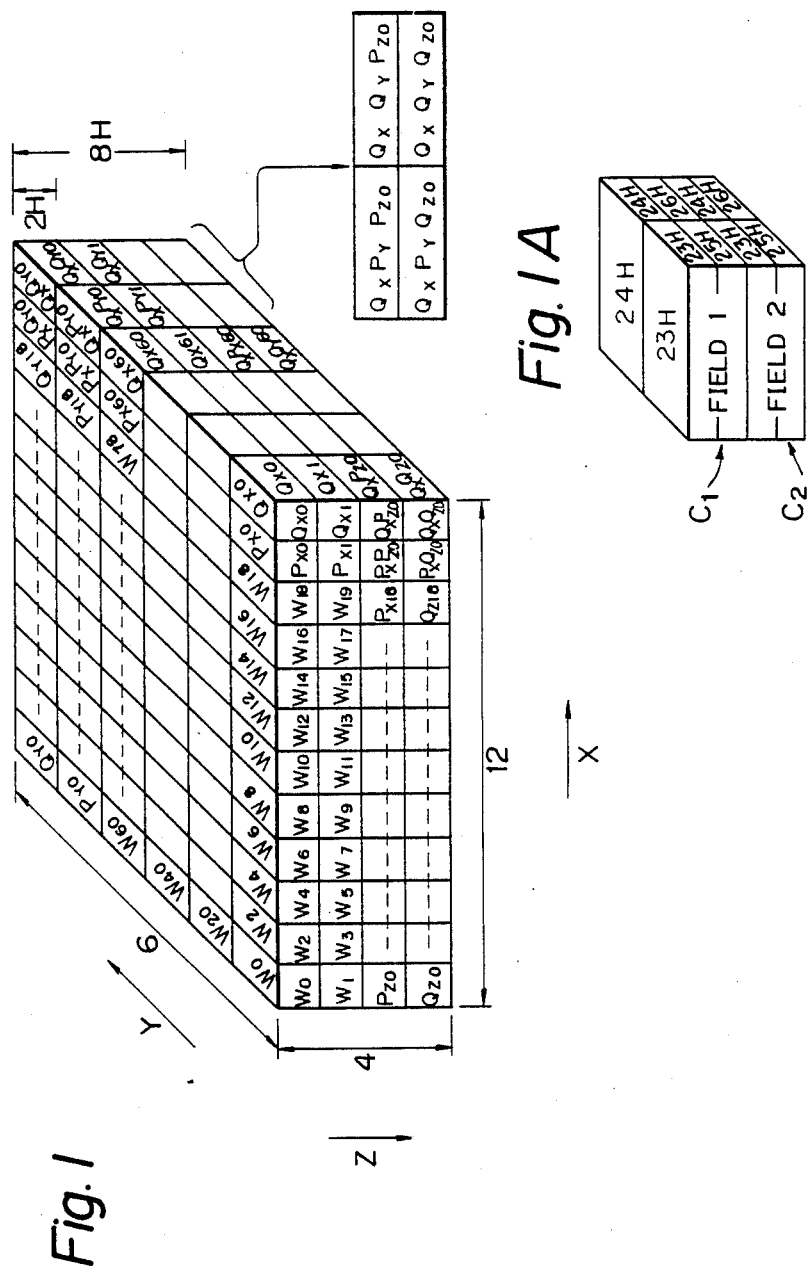
FIG. 1 is a schematic perspective view showing an example of a control data block consisting of the digital control data and the associated parity check bits carried on a video format signal to be processed in a method according to the present invention.

An error correcting method according to the present invention can be carried out by implementing the principles of correction modelled typically by the three-dimensional matrix blocks illustrated in FIGS. 1 through 4. The data block shown in FIG. 1 in particular is a control data block tailored to the interleaving and correction of the control data contained in video format signals. The control data block consists, by way of example, of a total of 80 control data bits $W_0$, $W_1$, $W_2$, ... $W_{79}$ included in a video format signal and redundant parity check bits of P and Q series to be used for the correction of the errors possibly contained in the control data. The data block consists of 12 address locations in the direction of the X-axis, 6 address locations in the direction of the Y-axis and 4 address locations in the direction of the Z-axis. The individual bits, or codes, at these addresses locations are to be sampled first in the direction of the Z-axis, then in the direction of the X-axis, and finally in the direction of the Y-axis. The subscripts 0, 1, 2, ... 79 annexed to the control data bits $W_0$, $W_1$, ... $W_{79}$ indicate the order in which the individual control data bits are to be sampled. Thus, the two control data bits $W_0$ and $W_1$ in the leftmost column are first sampled and thereafter the two control data bits $W_2$ and $W_3$ in the second column are sampled. After the two control data bits $W_{18}$ and $W_{19}$ in the tenth column from the left are sampled, the two control data bits $W_{20}$ and $W_{21}$ in the leftmost column forming part of the rows next to the foremost two rows are sampled.

The control data bits and parity check bits located at a total of 288 addresses of the data block thus arranged are inserted into appropriate time-axis vacancies of eight successive horizontal scanning lines (8 H) of the video format signal. More specifically, the control data block as a whole consists of or divided in effect into two, first and second subblocks $C_1$ and $C_2$ as shown in FIG. 1A and each of these subblocks $C_1$ and $C_2$ is allocated to four of the eight scanning lines. As will be seen from FIG. 1A, the first subblock $C_1$ is composed of the upper two layers of the entire data block and the second subblock $C_2$ is composed of the lower two layers of the entire data block. Accordingly, each of the subblocks $C_1$ and $C_2$ consists of 12 address locations in the direction of the X-axis, 6 address locations in the direction of the Y-axis and 2 address locations in the direction of the Z-axis. As the four successive scanning lines to carry one subblock $C_1$ are preferably used the 23rd to 26th horizontal scanning lines in the preceding one of two successive fields and as the four successive scanning lines to carry the other subblock $C_2$ are used the 23rd to 26th horizontal scanning lines in the later one of the two successive fields, as also shown in FIG. 1A. The control data bits and the redundant parity check bits contained in each of the subblocks $C_1$ and $C_2$ are inserted into the 23rd to 26th scanning lines of each of the two fields in a manner to appear first in the direction of the X-axis, then in the direction of the Y-axis, and finally in the direction of the Z-axis. The control data bits $W_0$ to $W_{79}$ contained in the video format signals to be reproduced are interleaved and error correction coded in this manner.

Figure 2:
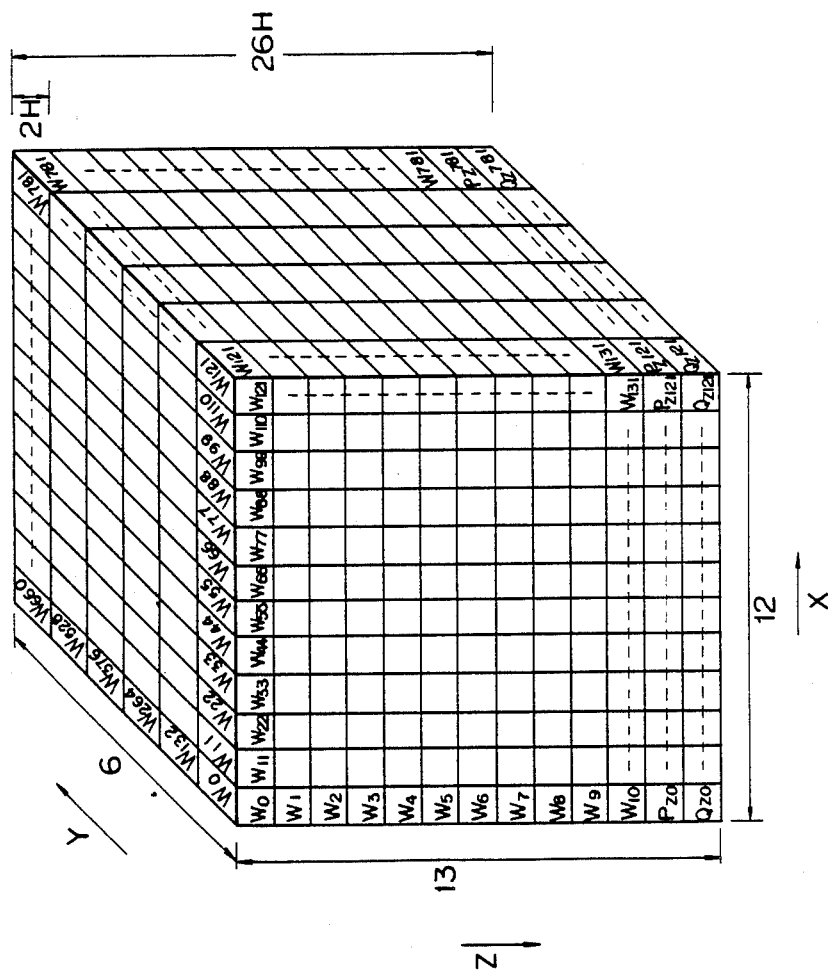
FIGS. 2 to 4 are similar to FIG. 1 but shows examples of an information data block consisting of the digital information data and the associated parity check bits carried on the video format signal to be processed in a method according to the present invention.
Figure 3:
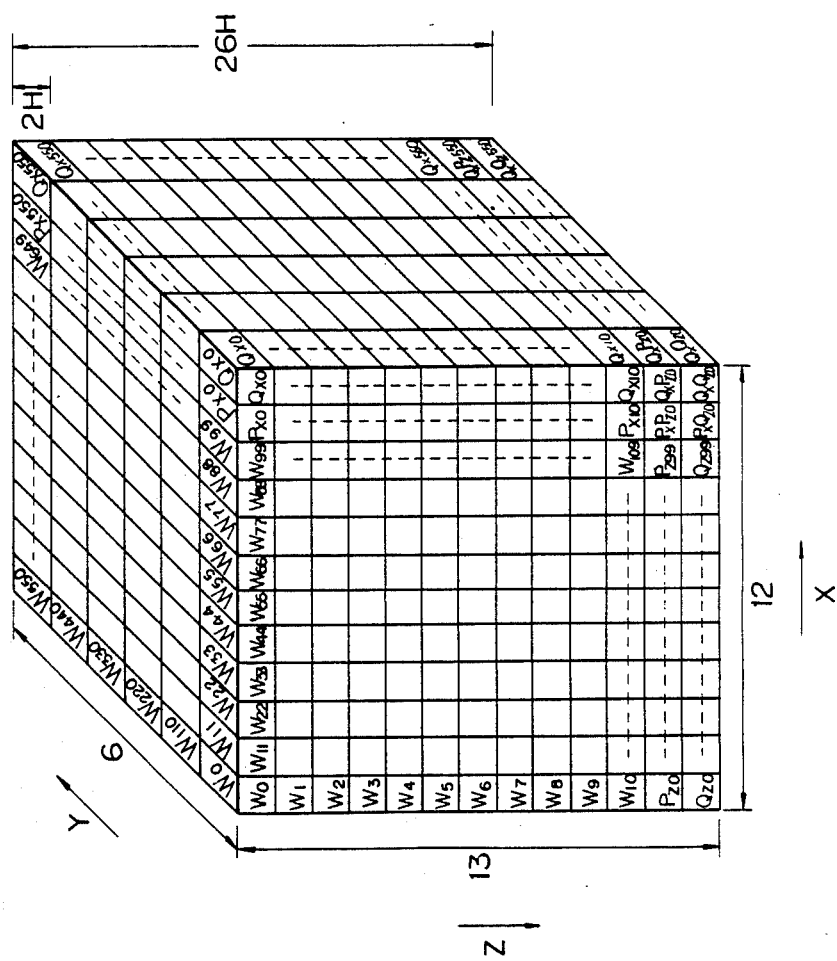
Figure 4:
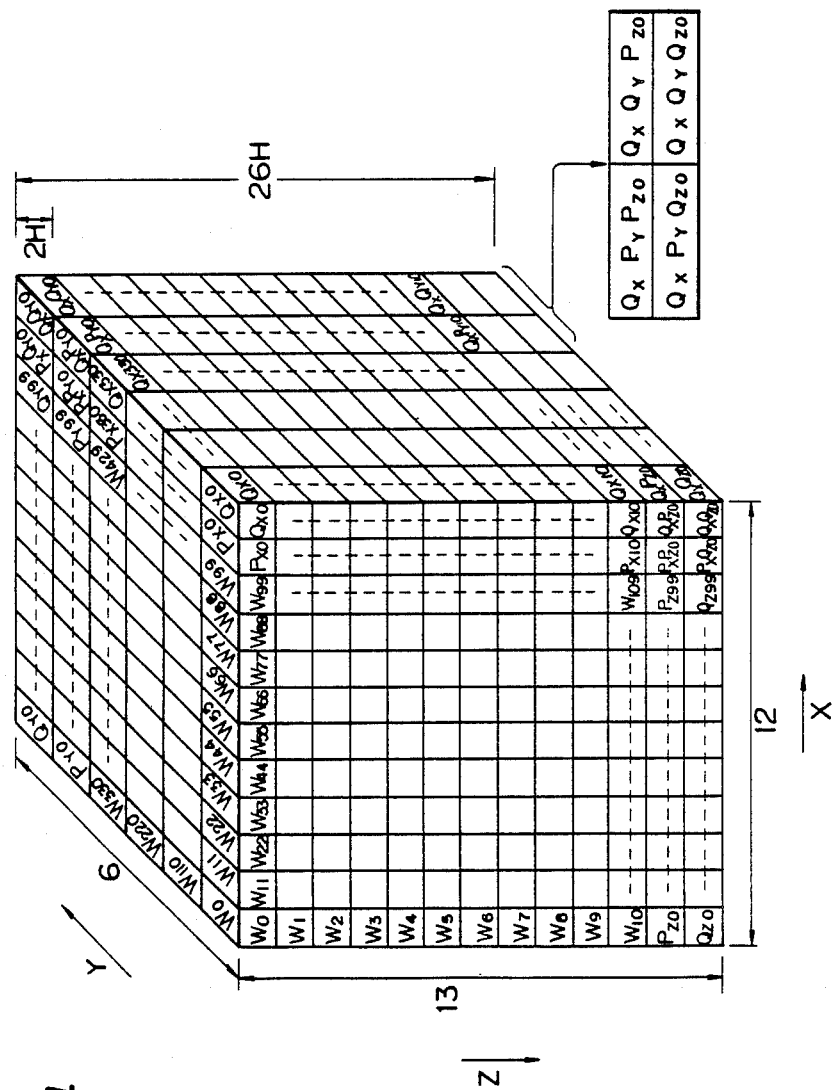

FIGS. 2 to 4 show examples of the information data blocks of different correction levels for the interleaving and error correction of the information data and the redundant parity check bits of P and Q series for the information data also contained in video format signals. The data blocks shown in FIGS. 2, 3 and 4 are of the first, second and third error correction levels, respectively. Each of the matrix blocks herein shown is assumed, by way of example, as consisting of 12 address locations in the direction of the X-axis, 6 address locations in the direction of the Y-axis and 13 address locations in the direction of the Z-axis. Each layer of each of these matrix blocks consists of 72 bits and is assumed to be assigned to two horizontal scanning lines of a video format signal and, accordingly, the information data and the parity check bits contained in the matrix block as a whole are inserted into a total of 26 horizontal scanning lines of each field of the video format signal. Further details of the configuration and the manner of implementation of each of the data matrix blocks herein shown are disclosed in U.S. patent application Ser. No. 544,245 filed Oct. 21, 1983 which corresponds to Japanese Patent Application No. 57-186569.

Figure 5:
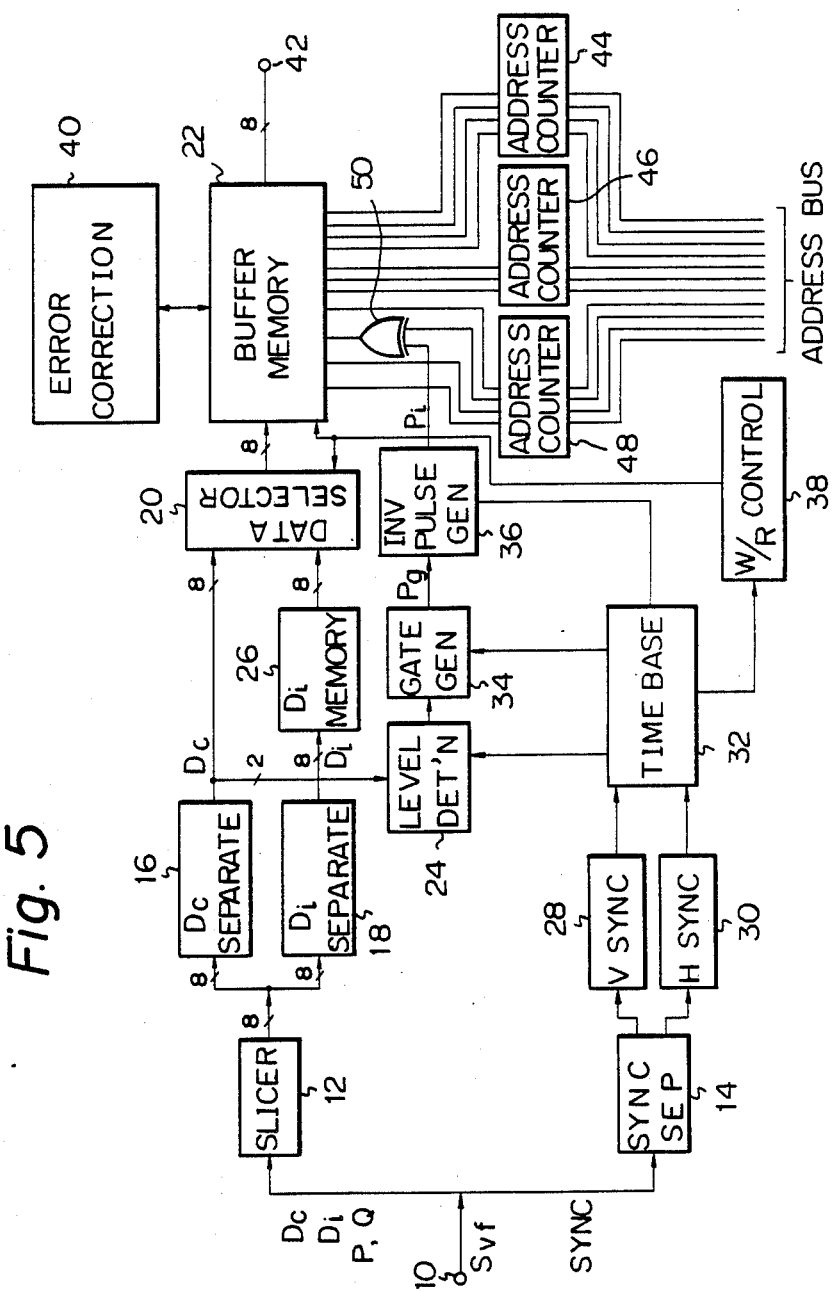
FIG. 5 is a block diagram showing a preferred embodiment of an error correction system to carry out a method according to the present invention.

FIG. 5 of the drawings shows a preferred embodiment of a system adapted to put into practice an error correcting method according to the present invention.

The system shown has an input terminal 10 to which a video format signal $S_{vf}$ is supplied from, for example, the video format signal encoder (not shown) of a video disc player. An example of such video format signal producing means is also disclosed in the above named U.S. patent application Ser. No. 544,245. As is customary in the art, the video format signal $S_{vf}$ consists of the control data bits ($D_c$), information data bits ($D_i$), the redundant parity check bits of P and Q series as discussed above and vertical and horizontal synchronization pulses. Such a video format signal $S_{vf}$ is fed on one hand to a data signal slicer network 12 and on the other hand to a sync separator network 14. The video format signal $S_{vf}$ supplied to the signal slicer network 12 is sliced at a predetermined amplitude level (which typically is the blanking level of the video format signal) and the resultant signal cleared of the synchronization pulses is fed to a control data and information data separator circuits 16 and 18 connected in parallel to the output terminals of the slicer circuit 12. The control data separator circuit 16 is operative to extract the control data bits $D_c$ and the parity check bits to correct the errors possibly contained in the data bits $D_c$ from the input signal. As discussed previously with reference to FIGS. 1 and 1A, these control data bits $D_c$ and the associated parity check bits are extracted by this separator circuit 12 in the form of the first control data subblock $C_1$ during the preceding one of successive two fields and the second control data subblock $C_2$ during the later one of the two fields. The control data bits $D_c$ and the associated parity check bits thus extracted are supplied via a data selector circuit 20 to a correction buffer memory 22 for storage therein, the buffer memory 22 being provided in the form of a random access memory. The control data bits $D_c$ and the parity check bits extracted from the video format signal $S_{vf}$ by the control data separator circuit 16 are also fed to a correction level determinator network 24. The correction level determinator network 24 is operative to determine which of the correction levels represented by, for example, the information data blocks of FIGS. 2, 3 and 4 is commensurate with the control data $D_c$ received, producing an output signal indicative of the correction level thus determined. On the other hand, the information data separator circuit 18 is operative to extract, from the output signal from the data signal slicer network 12, the information data bits $D_i$ and the redundant parity check bits of P and Q series to correct the errors possibly contained in these data bits $D_i$. As discussed previously, these information data bits $D_i$ and the parity check bits associated therewith are included in 26 horizontal scanning lines of each field of the supplied video format signal $S_{vf}$. The information data bits $D_i$ and the associated parity check bits thus extracted from the video format signal $S_{vf}$ are loaded into an information data memory 26 which is configured in the form of a large-capacity random access memory. The data selector circuit 20 is operative to shift, at controlled timings, between the outputs of the control data separator circuit 16 and the information data memory 26 and selectively passes therethrough the control data bits $D_c$ and the parity check bits therefor fed from the circuit 16 or the information data bits $D_i$ and the parity check bits therefor read from the memory 26. The data and the parity check bits thus passed through the data selector circuit 20 are memorized into the correction buffer memory 22 with a write instruction signal supplied to the selector circuit 20 and buffer memory 22.

The video format signal $S_{vf}$ supplied to the sync separator network 14 is processed to separate vertical and horizontal synchronizing signal components from the signal received. The vertical and horizontal synchronizing signal components are fed through vertical and horizontal synchronizing signal separator circuits 28 and 30 to a timebase circuit 32 which produces different timing signals to dictate the timings at which various components of the system are to be initiated into action. One of these timing signals is fed to the correction level determinator network 24 and others to, for example, a gating pulse generator circuit 34, a code inverting pulse generator circuit 36 and a read/write control circuit 38. The gating pulse generator circuit 34 is responsive to the output signal from the correction level determinator network 24 and produces a gating pulse $P_g$ indicating the time duration for which the control data $D_c$ and the associated parity check bits of the third correction level are to be output from the correction buffer memory 22. The gating pulse $P_g$ thus produced by the gating pulse generator circuit 24 is fed to the code inverting pulse generator circuit 36 which further receives from the timebase circuit 32 timing signals which indicate the time duration of the later one of successive two fields and the time duration from the 23rd to 26th horizontal scanning lines in each of the successive two fields. The read/write control circuit 38 is also responsive to a timing signal from the timebase circuit 32 and supplies write or read instruction signals to the data selector circuit 20 and the correction buffer memory 22. The data selector circuit 20 is thus activated to selectively pass therethrough the control data bits $D_c$ and the associated parity check bits from the control data separator circuit 16 and the information data bits $D_i$ and the associated parity check bits from the information data memory 26 in response to the read and write instruction signals supplied from the read/write control circuit 38. These information and control data bits $D_i$ and $D_c$ and the associated parity check bits thus selectively passed through the data selector circuit 20 are loaded into the correction buffer memory 22. The data bits $D_i$ and $D_c$ and the parity check bits memorized into the correction buffer memory 22 are released from selected addresses of the memory 22 to an error correction circuit 40 through a bidirectional bus at timings controlled by the signals from the read/write control circuit 38. The data bits $D_i$ and $D_c$ in the buffer memory 22 are also released from selected addresses of the memory 22 to data output terminals 42 upon completion of the error correcting operation. The read/write signals supplied from the read/write control circuit 38 dictates the timings of various operations involving the buffer memory 22. These timings include those at which the data and the associated parity check bits passed through the data selector circuit 20 are to be loaded into the memory 22, those at which the information data and the associated parity check bits stored at selected addresses of the memory 22 are to be released to the error correction circuit 40, those at which the information data and the associated parity check bits once supplied to the error correction circuit 40 are to be transferred back to the corresponding addresses of the memory 22, and those at which the control and information data located at selected addresses of the memory 22 are to be released to the data output terminals 42.

The correction buffer memory 22 has address input terminals connected to X-axis, Y-axis and Z-axis address counters 44, 46 and 48 which are operative to count the addresses in the directions of the X-, Y- and X-axes in the control data block shown in FIG. 1. Each of these address counters 44, 46 and 48 thus produces address codes indicative of the addresses thus counted. In the arrangement herein shown, the correction buffer memory 22 is assumed, by way of example, as having 16 addresses assigned to the direction of the X-axis, 8 addresses assigned to the direction of the Y-axis and 16 addresses assigned to the direction of the Z-axis. Accordingly, the address code for the X-axis consists of four binary digits $X_0$ to $X_3$, the address code for the Y-axis consists of three binary digits $Y_0$ to $Y_2$, and the address code for the Z-axis consists of four binary digits $Z_0$ to $Z_3$. The address codes thus produced by the X-axis, Y-axis and Z-axis address counters 44, 46 and 48 select addresses from the correction buffer memory 22 whereupon the control and information data and the associated parity check bits are written or read at the selected addresses of the memory 22 respectively in response to a write or read instruction signal from the read/write control circuit 38. A two-input exclusive-OR gate 50 is inserted in the bit line assigned to the second least significant digit $Z_1$ of the address code for the Z-axis. The exclusive-OR gate 50 has one input terminal connected to the output terminal assigned to the second least significant digit $Z_1$ of the Z-axis address counter 48 and the other input terminal connected to the output terminal of the code inverting pulse generator circuit 36 as shown. The second least significant digit $Z_1$ of the address code for the Z-axis is thus inverted by the pulse $P_i$ from the code inverting pulse generator circuit 36 for the reason that will be clarified as the description proceeds.

Figures 6, 7:
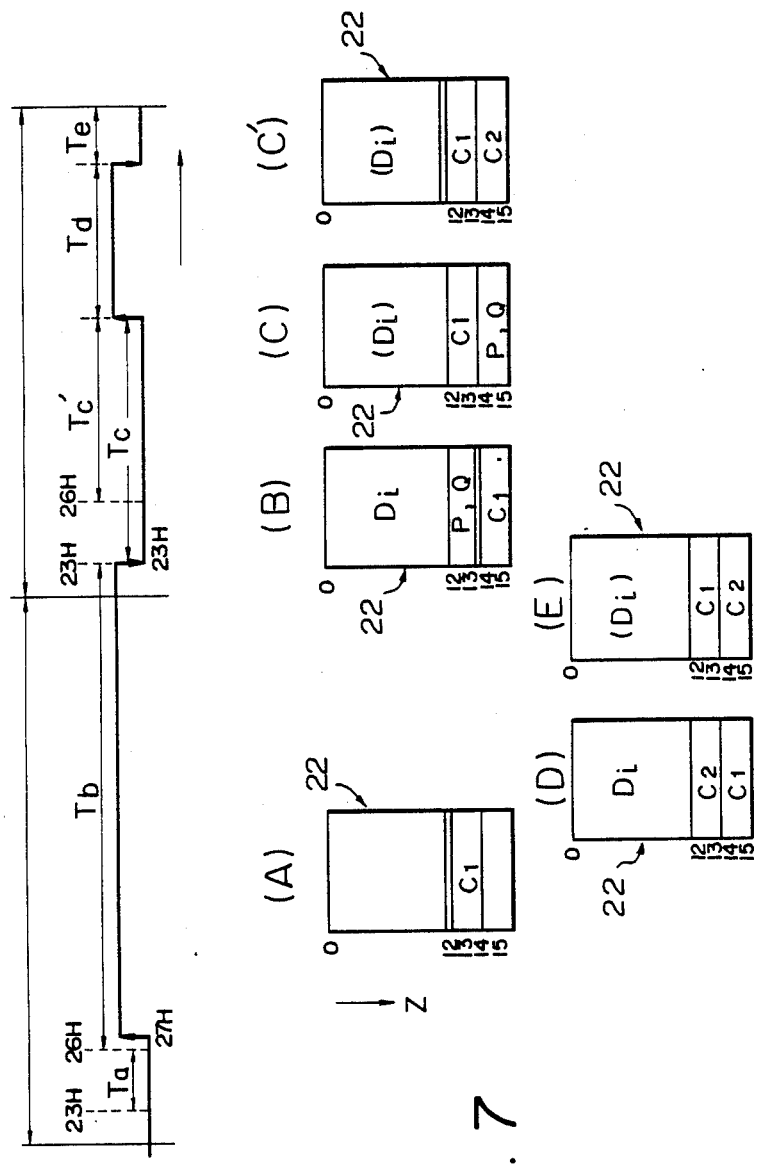
FIG. 6 is a time chart showing the waveform of a pulse signal used to select an address in a memory forming part of the system shown in FIG. 5.
FIG. 7 is a view showing memory maps which the memory included in the system shown in FIG. 5 forms in response to the pulse signal illustrated in FIG. 7.

In operation, the code inverting pulse generator circuit 36 produces an inverting pulse signal $P_i$ having a waveform shown in FIG. 6 during successive two fields of a video format signal, the fields being herein denoted as first and second fields. As shown, the pulse $P_i$ produced by the code inverting pulse generator circuit 34 assumes a logic "0" state for the period of time (indicated at $T_a$) from the start of the first field to the trailing edge of the 26th line pulse (26 H) in the first field, and a logic "1" state for the period of time (indicated at $T_b$) from the leading edge of the 27th line pulse 27 H) in the first field to the leading edge of the 23rd line pulse (23 H) in the second field. The inverting pulse signal $P_i$ further has a logic "0" state for the period of time (indicated at Tc) from the leading edge of the 23rd line pulse in the second field to the time when a gating pulse $P_g$ appears at the output terminal of the gating pulse generator circuit 34. This gating pulse $P_g$ indicates the time duration for which the control data $D_c$ and the associated parity check bits of the third correction level is to be read from the correction buffer memory 22 as previously noted. During the period of time (indicated at $T_d$) for which the gating pulse $P_g$ lasts, the pulse signal $P_i$ output from the code inverting pulse generator circuit 36 remains at a logic "1" state and, upon termination of the gating pulse $P_g$, the inverting pulse signal $P_i$ remains at a logic "0" state for the period of time (indicated at $T_e$) until the second field terminates.

The correction buffer memory 22 used in the error correction system embodying the present invention is of the type having a relocatable subroutine providing different memory maps in response to different address codes. FIG. 7 shows these memory maps which the correction buffer memory 22 implements during the above mentioned periods of time $T_a$ to $T_e$. In this FIG. 7, the correction buffer memory 22 is assumed to have a total of sixteen addresses 0 to 15 in the direction of the Z-axis as previously noted.

During the period of time $T_a$, the first control data subblock $C_1$ of the control data $D_c$ and the associated parity check bits extracted from the video format signal $S_{vf}$ are memorized at the addresses 12 and 13 of the buffer memory 22, with the logic "0" pulse signal $P_i$ applied to one input terminal of the exclusive-OR gate 50. This condition is schemetically represented by section (A) of FIG. 7. During the subsequent period of time $T_b$ when the inverting pulse signal $P_i$ is shifted to a logic "1" state, the second least significant digit $Z_1$ of the address code in the direction of the Z-axis is compulsorily inverted by the logic "1" inverting pulse signal $P_i$. As a consequence, the first control data subblock $C_1$ is shifted from the addresses 12 and 13 (binary coded as, for example, "1100" and "1101") to the addresses 14 and 15 (binary coded as, for example, "1110" and "1111") of the buffer memory 22. Thereupon, the information data $D_i$ and the associated P and Q series parity check bits extracted from the video format signal $S_{vf}$ are memorized at the addresses 0 to 13 of the buffer memory 22 in the form of the information data block of the selected correction level. In this instance, the parity check bits of the P and Q series contained in the particular information data block occupy "physical" memory locations at the addresses 12 and 13 of the buffer memory 22. During this period of time b, the information data block thus "physically" occupying the addresses 0 to 13 of the buffer memory 22 is transferred between the buffer memory 22 and the error correction circuit 40, to execute correction of the errors which may be contained in the information data $D_i$. These operations taking place during the period of time b are schematically represented by section (B) of FIG. 7.

When the second field starts thereafter, the address code for the Z-axis restores the original sequence of bits, with the code inverting pulse signal $P_i$ shifted from the logic "1" state to the logic "0" state. It therefore follows that the physical memory locations which the first control data subblock $C_1$ is to occupy in the buffer memory 22 are shifted back from the addresses 14 and 15 to the addresses 12 and 13. At the same time, the physical memory locations which the parity check bits of the P and Q series contained in the information data block are to occupy in the buffer memory 22 are shifted back from the addresses 14 and 15 to the addresses 12 and 13 as shown in section (C) of FIG. 7. Immediately thereafter, the second subblock $C_2$ of the control data $D_c$ is extracted from the video format signal $S_{vf}$ by the control data separator circuit 16 and is stored at the physical memory locations corresponding to the addresses 14 and 15 of the buffer memory 22 as shown in section (C') of FIG. 7. Thus, the number of the parity check bits associated with the information data bits $D_i$ and the total number of the control data bits $D_c$ and the parity check bits contained in the second control data subblock $C_2$ are preferably equal to each other. The P and Q series parity check bits for the information data $D_i$ are now erased from the buffer memory 22 although the information data per se are still retained at the addresses 0 to 11 of the buffer memory 22 as indicated by $D_i$ in parentheses, this however offering no problem since the correction of the errors of the information data $D_i$ has already been complete. The period of time for which the second control data subblock $C_2$ is written into the buffer memory 22 in addition to the control data subblock $C_2$ is represented by $T_c'$ in FIG. 6. Now that both of the first and second control data subblocks $C_1$ and $C_2$ are written into the buffer memory 22, correction of errors in the control data $D_c$ in the entire control data block (FIG. 1) is executed with the use of the P and Q series parity check bits in the subblocks $C_1$ and $C_2$ during this period of time $T_c'$.

The information data $D_i$ remaining at the addresses 0 to 11 of the correction buffer memory 22 and the control data $D_c$ included in the control data subblocks $C_1$ and $C_2$ at the addresses 12 to 15 of the buffer memory 22 are then released from the memory 22 to the data output terminals 42 for being memorized into any appropriate storage means (not shown). For this purpose, the second least significant digit $Z_1$ of the address code in the direction of the Z-axis is for a second time inverted by the logic "1" pulse signal $P_i$ from the inverting pulse generator circuit 36 during the period of time $T_d$. When this occurs, the first and second control data subblocks $C_1$ and $C_2$ exchange their physical memory locations in the buffer memory 22 as shown in section (D) of FIG. 7 and, as a consequence, all the data stored in the memory 22 are normalized. The corrected information and control data $D_i$ and $D_c$ included in the first and second fields under consideration are now ready to be output from the buffer memory 22 to the data output terminals 42. Upon lapse of the time $T_d$, the first and second control data subblocks $C_1$ and $C_2$ exchange their physical memory locations in the buffer memory 22 for a second time as shown in section (E) of FIG. 7 and the buffer memory 22 is ready to receive the information and control data and the associated parity check bits of the subsequent two successive fields.

It has been described that only the second least significant digit $Z_1$ of the address code in the direction of the Z-axis is to be inverted by the pulse signal $P_i$ from the code inverting pulse generator circuit 36. Such an assumption is based on the number assumed to be four of the address locations in the direction of the Z-axis of the control data block exemplified in FIG. 1 and is thus merely for the purpose of description and illustration. Accordingly, any two or more of the address code in at least one of the directions of the X-, Y- and Z-axes may be inverted to relocate the control data subblocks $C_1$ and $C_2$ depending upon the configuration and size of the data block of the control data and the associated parity check bits, insofar as the second control data subblock $C_2$ is stored at selected ones of those physical memory locations of the buffer memory 22 occupied by the parity check bits associated with the information data $D_i$ which have been corrected completely.

As will have been understood from the foregoing description, an error correcting method according to the present invention is characterized, inter alia in that a digital data block consisting of digital data and the associated redundant parity check bits is divided, in effect, into two halves which are respectively inserted compactly into successive two fields of a video format signal to make an effective and efficient use of limited time-axis vacancies of the video format signal. The method according to the present invention is further characterized by the effective and efficient use of a memory in which the physical memory locations which have been occupied by the parity check bits associated with the data already corrected completely are occupied by the latter half of the entire data block with the former half of the data block stored at other physical memory locations of the memory. With this particular feature, the timings at which the digital data are to be extracted from the video format signal and the timings at which errors of the digital data are to be corrected are streamlined advantageously to enable the system to operate efficiently in its entirety and to improve the performance efficiency of the memory used in the system.

What is claimed is:

1. A method of correcting errors in information data bits and control data bits of a video format signal which is recorded and subsequently reproduced, said video format signal containing redundant parity check bits associated respectively with said information data bits and said control data bits, said information data bits and the parity check bits associated therewith being respectively assigned to addresses located in an information data block in the form of an n-dimensional sequence (where n is an integar) and said control data bits and the parity check bits associated therewith being respectively assigned to addresses located in a control data block also in the form of an n-dimensional sequence, said information data block and said control data block being carried on said video format signal, the method comprising:

dividing said control data block into a first half and a second half thereof, and sequentially recording said first half of said control data block, said information data block, and said second half of the control data block respectively in that order, and, during reproduction of said recorded video format signal, sequentially:

loading said first half of said control data block into memory means for storage therein at selected addresses;

loading said information data block into said memory means for storage therein at selected addresses;

performing correction of errors in said information data bits by utilizing said parity check bits contained in said information data block;

loading said second half of said control data block into said memory means for storage therein at the ones of said addresses ocupied by said parity check bits of said information data block; and performing correction of errors in said control data bits by utilizng said parity check bits contained in said control data block.

2. A method as set forth in claim 1, wherein the total number of bits contained in said second half of said control data block is equal to the number of said parity check bits contained in said information data block.

3. A method as set forth in claim 1 or 2, wherein said first half and second half of said control data block are identical in size, and wherein said first half of said control data block is first stored at a set of addresses of said memory means which are located adjacent to the addresses at which said information data block is to be stored, and wherein said first half of said control data block is subsequently relocated in said memory means such that the parity check bits associated with said information data bits are stored at a set of addresses located adjacent to the set of addresses at which said first half of said control data block has been relocated.

4. A method as set forth in claim 3, wherein upon completion of correction of said errors in said information data bits, the set of addresses occupied by said first half of said control data block and the set of addresses occupied by the parity check bits associated with said information data bits in said memory means are exchanged with each other, and wherein said second half of said control data block is subsequently stored at the addresses of said memory means which have been occupied by the parity check bits associated with said information data bits.

5. A method as set forth in claim 4, wherein said exchange of the set of addresses occupied by said first half of said control data block and the set of addresses occupied by the parity check bits associated with said information data bits in said memory means is performed by inverting at least one of a plurality of binary digits forming an address code to be suppled to said memory means.

6. A method as set forth in claim 5, wherein at least one of said binary digits forming said address code is inverted by implementing an exclusive-OR function between said at least one digit and a code inverting pulse signal.

7. A method as set forth in claim 3, wherein said first half of said control data block is relocated in said memory means by inverting at least one of a plurality of binary digits forming an address code to be supplied to said memory means.

8. A method as set forth in claim 7, wherein at least one of said binary digits forming said address code is inverted by implementing an exclusive-OR function between said at least one digit and a code inverting pulse signal.

* * * * *